United States Patent
Pfeiffer

(10) Patent No.: US 7,403,127 B2
(45) Date of Patent: **\*Jul. 22, 2008**

(54) DEVICE FOR ESTABLISHING AND/OR MONITORING A PREDETERMINED FILL LEVEL IN A CONTAINER

(75) Inventor: Helmut Pfeiffer, Steinen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/512,120

(22) Filed: Aug. 30, 2006

(65) Prior Publication Data

US 2006/0290524 A1    Dec. 28, 2006

Related U.S. Application Data

(63) Continuation of application No. 10/472,198, filed as application No. PCT/EP02/03443 on Mar. 27, 2002, now Pat. No. 7,102,528.

(30) Foreign Application Priority Data

Mar. 28, 2001  (DE) ............................... 101 15 558
Nov. 6, 2001   (DE) ............................... 101 53 937

(51) Int. Cl.
    *G08B 21/00* (2006.01)
(52) U.S. Cl. .................. 340/613; 340/666; 340/623; 318/648; 73/54.41
(58) Field of Classification Search .......... 340/613, 340/612, 666, 621, 618, 620, 623; 318/648, 318/646, 645, 642; 73/45.5, 54.41
See application file for complete search history.

(56) References Cited

U.S. PATENT DOCUMENTS

| | | | |
|---|---|---|---|
| 4,594,584 A | 6/1986 | Pfeiffer | |
| 5,264,831 A | 11/1993 | Pfeiffer | |
| 5,408,168 A * | 4/1995 | Pfandler | ..................... 318/642 |
| 5,596,139 A | 1/1997 | Miura | |
| 5,625,343 A | 4/1997 | Rottmar | |

(Continued)

FOREIGN PATENT DOCUMENTS

| | | |
|---|---|---|
| DE | 33 48 119 C2 | 2/1985 |
| DE | 36 01 704 A1 | 7/1987 |
| DE | 41 18 793 A1 | 10/1992 |
| GB | 2 185 575 A | 7/1987 |

*Primary Examiner*—George Bugg
*Assistant Examiner*—Daniel Previl
(74) *Attorney, Agent, or Firm*—Bacon & Thomas, PLLC

(57) ABSTRACT

A device for establishing and/or monitoring a predetermined fill level in a container is provided, to indicate the fill level in a container and exhibiting a best possible, optimum fit for an application, which device includes: a mechanical oscillatory structure placed at the height of the predetermined fill level, which structure exhibits a membrane and two mutually separated oscillation bars formed thereon, an electromechanical transducer, which in operation excites the oscillatory structure to oscillate with oscillations, such that the oscillation bars execute oscillations perpendicular to their longitudinal axis, a receiver- and evaluation-unit, which uses the oscillations to establish and/or monitor whether the predetermined fill level has been reached, or not, in which the oscillation bars exhibit a shape in which a mass moment of inertia of a liquid quantity, which the oscillation bars move with them in the immersed state in the liquid, is as large as possible and greater than 0.2 times a mass moment of inertia of the oscillation bars.

15 Claims, 4 Drawing Sheets

U.S. PATENT DOCUMENTS

| | | |
|---|---|---|
| 5,631,633 A | 5/1997 | Dreyer |
| 5,895,848 A | 4/1999 | Wilson |
| 6,148,665 A | 11/2000 | Getman |
| 6,644,116 B2 * | 11/2003 | Getman et al. ............ 73/290 V |
| 6,938,475 B2 * | 9/2005 | Lopatin .................... 73/290 V |
| 7,043,981 B2 * | 5/2006 | Kuhny et al. .............. 73/290 V |
| 7,102,528 B2 * | 9/2006 | Pfeiffer ...................... 340/613 |

* cited by examiner

ISO 8601

DEVICE FOR ESTABLISHING AND/OR MONITORING A PREDETERMINED FILL LEVEL IN A CONTAINER

This application is a continuation of U.S. patent application Ser. No. 10/472,198, which was filed on Sep. 29, 2003 now U.S. Pat No. 7,102,528 and will issue on Sep. 5, 2006; and which is a U.S. National Stage of PCT/EP02/03443 which was filed on Mar. 27, 2002.

FIELD OF THE INVENTION

The invention relates to a device for establishing and/or monitoring a predetermined fill level in a container.

BACKGROUND OF THE INVENTION

Fill level limit switches of this type are applied in many branches of industry, especially in the chemical and food industries. They serve for detecting a limit level and are e.g. used as overfill guards or protection against pumps running empty.

DE-A 44 19 617 describes a device for establishing and/or monitoring a predetermined fill level in a container. The device includes:
  a mechanical oscillatory structure placed at the height of the predetermined fill level,
    which exhibits a membrane, or diaphragm, and two mutually separated oscillation bars formed thereon,
  an electromechanical transducer,
    which in operation excites the oscillatory structure to oscillate with oscillations, such that the oscillation bars execute oscillations perpendicular to their longitudinal axis, and
  a receiver- and evaluation-unit, which uses the oscillation to establish and/or monitor whether the predetermined fill level has been reached, or not.

The oscillation bars have flat, mutually parallel paddles on their membrane-far ends. A normal to the paddle surfaces is perpendicular to the longitudinal axis of the paddles.

The electromechanical transducer has at least one transmitter, at which an electrical, transmitted signal is applied and which excites the mechanical oscillatory structure to oscillate. A receiver is provided, which picks up the mechanical oscillations of the oscillatory structure and transforms such into an electrical, received signal. The evaluation unit obtains the received signal and compares its frequency with a reference frequency. It produces an output signal, which indicates that the mechanical oscillatory structure is covered by a fill material, if the frequency has a value smaller than a reference frequency, and that it is not covered, if the value is larger. A control circuit is provided, which regulates a phase difference between the electrical, transmitted signal and the electrical, received signal to a determined, constant value, at which the oscillatory structure executes oscillations with a resonance frequency.

The control circuit is e.g. formed such that the received signal is amplified and fed back to the transmitted signal through a phase shifter.

Such devices are used for a multiplicity of different applications and are, therefore, exposed to quite varied requirements.

SUMMARY OF THE INVENTION

An object of the invention is to provide a device for establishing and/or monitoring a predetermined fill level in a container, which device has a best possible fit for a multiplicity of applications.

The object is solved, according to the invention, by a device for establishing and/or monitoring a predetermined fill level in a container, which device includes:
  a mechanical oscillatory structure placed at the height of the predetermined fill level,
    which exhibits a membrane and two mutually separated oscillation bars formed thereon,
  an electromechanical transducer,
    which in operation excites the oscillatory structure to oscillate with oscillations, such that the oscillation bars execute oscillations perpendicular to their longitudinal axis, and
  a receiver- and evaluation-unit, which uses the oscillations to establish and/or monitor whether the predetermined fill level has been reached, or not,
  in which the oscillation bars exhibit a shape in which a mass moment of inertia of a liquid quantity, which the oscillation bars move with them in the immersed state in the liquid, is as large as possible and greater than 0.2 times a mass moment of inertia of the oscillation bars.

According to one embodiment, the oscillation bars have flat, mutually parallel paddles on their membrane-far ends, wherein a normal to the paddle surfaces is perpendicular to the longitudinal axis of the oscillation bars.

According to a further development
  the oscillation bars extend in operation through an opening into the container,
  the opening has a diameter of less than five centimeters,
  the membrane has a diameter which is slightly smaller than the diameter of the opening,
  the paddles have a maximum width, wherein an outer diameter of the device in the region of the oscillation bars is smaller than, or equal to, the diameter of the opening.

According to a further development, a length L of the oscillation bars including the paddles is chosen such that a resonance frequency of the oscillatory structure is smaller than 1400 Hz at maximum paddle width.

According to a further development, the paddles have a length l, which amounts to 50%+/−10% of the length L of the oscillation bars.

According to a further development, the paddles have a small thickness.

According to one embodiment, the membrane is made of a metal and has a thickness of 0.6 to 1 mm.

DESCRIPTION OF THE PREFERRED EMBODIMENT

According to a first embodiment,
  the opening has a diameter of about 24 mm (½ inch),
  the membrane is placed in the opening and closes it,
  each oscillation bar has a mass moment of inertia in the range from less than, or equal to, 18 kgmm$^2$ to greater than, or equal to, 1.1 kgmm$^2$,
  the paddles have a thickness between 1 mm and 4.1 mm, and
  the oscillation bars have a length between 37 mm and 60 mm.

According to a second embodiment,
the opening has a diameter of about 12 mm (¼ inch),
the membrane is placed in the opening and closes it,
each oscillation bar has a mass moment of inertia in the range from less than, or equal to, 1.6 kgmm² to greater than, or equal to, 0.4 kgmm²,
the paddles have a thickness between 1 mm and 2 mm, and
the oscillation bars have a length between 30 mm and 40 mm.

The invention also resides in a method for manufacturing one of the above-recited devices, in which
from a predetermined diameter of the opening in the container, the maximum diameter of the membrane is determined,
a mutual separation of the paddles and their thickness is fixed as a function of the diameter of the membrane,
subsequently, for obtaining a high sensitivity of the device, the maximum possible width of the paddles is determined,
a minimum length of the oscillation bars is ascertained, from which a resonance frequency of the oscillatory structure is less than 1400 Hz, and
the oscillatory structure is manufactured using the forenamed specifications.

The oscillatory structure, in operation, executes forced harmonic oscillations. Preferably, the device is driven in resonance, since, then, an amplitude of the oscillations is maximum. An immersion of the oscillatory structure in the liquid effects an additional damping of the resonance oscillation and leads to a reduction of the oscillation amplitude and the resonance frequency. The reason for the damping is that a quantity of liquid moves with the oscillation bars, as a function of the shape of the oscillation bars.

By constructing the oscillation bars such that the mass moment of inertia of the water mass, which moves with the oscillation bars in the immersed state, is as large as possible in comparison with the mass moment of inertia of the oscillation bars, the device exhibits a very high sensitivity. I.e., a measurement effect resulting from the immersion in the liquid is very large. For the mass moments of inertia discussed here, a reference axis lies in each case in the plane of the membrane and extends perpendicular to the normal to the paddle surfaces.

Experiments have shown that it is sufficient for most applications that the mass moment of inertia of the moved liquid mass be at least equal to 0.2 times the mass moment of inertia of the oscillation bars. This assures that the device operates error free, even under very difficult conditions, e.g. in media with a low density. For the size of the liquid quantity which moves with the oscillation bars, an area projected in the direction of movement of the oscillation bars is the ruling factor. The larger the projected area, the larger is the quantity of liquid which moves in accompaniment.

A measure for the sensitivity of the device is a change of the resonance frequency. In the following, the sensitivity δ means the difference between the resonance frequency $\omega_f$, with which the oscillatory structure oscillates, when it is immersed in the liquid, and the resonance frequency $\omega_0$ with which the oscillatory structure oscillates out of the liquid related to the resonance frequency $\omega_0$, with which the oscillatory structure oscillates out of the liquid, where:

$$\delta = \frac{|\omega_f - \omega_o|}{\omega_o}$$

Experiments have shown that the sensitivity δ is a function of the ratio V of the mass moment of inertia of the liquid mass moved with the oscillation bars in the immersed state and the mass moment of inertia of the oscillation bars. The relationship is:

$$\delta = 1 - (1/(1+V))^{1/2} \quad (1)$$

For a ratio V of 0.2, the sensitivity is already 16%. The formula given in Equation (1) is graphically presented in FIG. 1.

The invention and additional advantages are explained in more detail on the basis of the figures of the drawing, where an example of an embodiment is presented; equal elements are given the same reference symbols in the figures.

DETAILED DESCRIPTION

Figure 1:
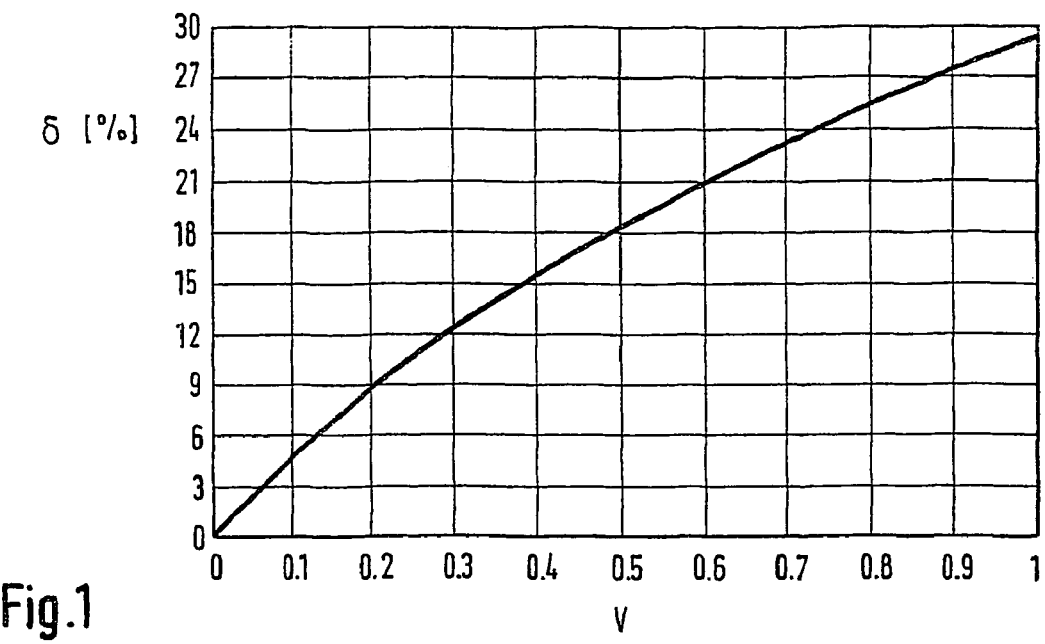
FIG. 1 shows a sensitivity of a device as a function of the ratio V of the mass moment of inertia of the liquid quantity which moves with the oscillation bars, to the mass moment of inertia of the oscillation bars.
Figure 2:
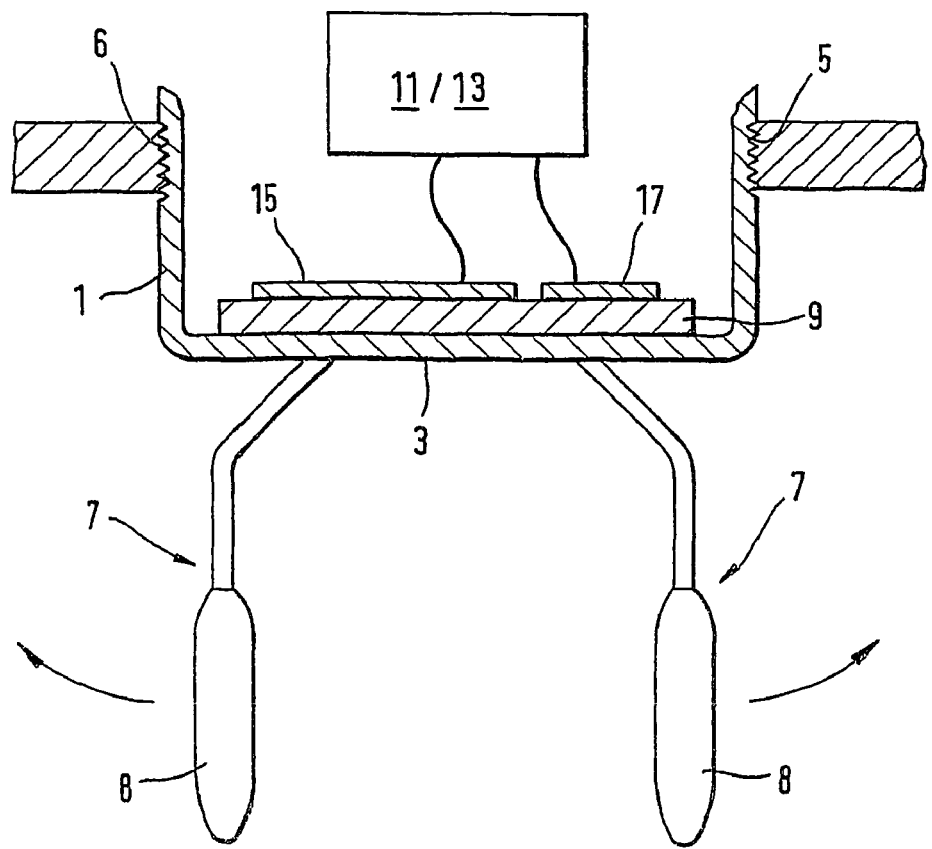
FIG. 2 shows a longitudinal cross section through a device for establishing and/or monitoring a predetermined fill level.

FIG. 2 shows a longitudinal cross section through a device of the invention for establishing and/or monitoring a predetermined fill level in a container. The device has a mechanical oscillatory structure for placement at the height of the predetermined fill level.

The oscillatory structure includes an essentially cylindrical housing 1, which is closed off flush at the front by a circular membrane 3. A thread 5 is formed on the housing 1, so that the device can be screwed into a container opening 6 arranged at the height of the predetermined fill level. Other techniques of securement known to those skilled in the art, e.g. flanges formed on the housing 1, can likewise be used.

Figure 3:
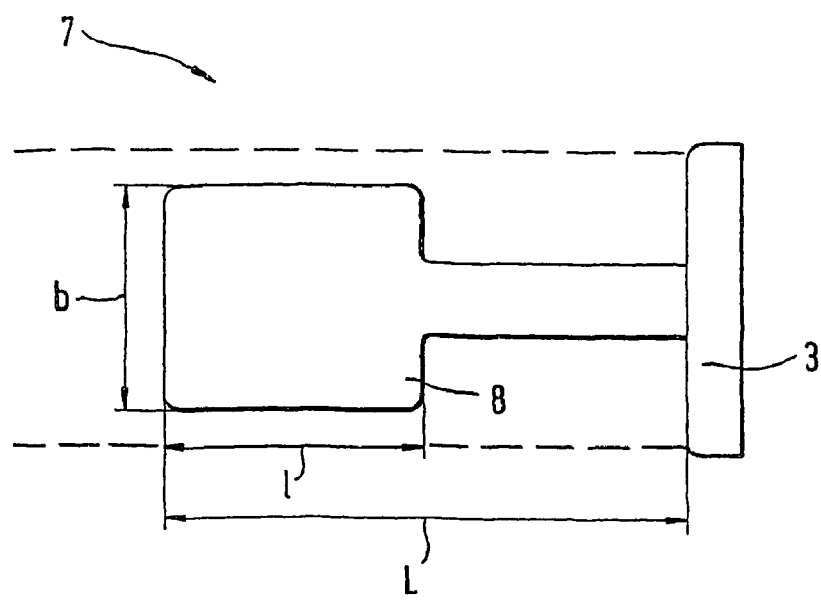
FIG. 3 shows a side view of an oscillation bar.

Two oscillation bars 7, likewise part of the oscillatory structure, are formed on the membrane 3 outside of the housing 1 and point into the container. FIG. 3 shows a view of the oscillation bars 7. These are made to oscillate perpendicular to their longitudinal axes by an electromechanical transducer 9 arranged on membrane 3 inside the housing 1. The electromechanical transducer 9 in this embodiment is a disk-shaped piezoelectric element, which is situated on the membrane 3 and fixedly connected therewith. The piezoelectric element is e.g. glued, soldered or brazed on the membrane 3 and causes the membrane to undergo bending oscillations when operating. This bending motion in turn causes the oscillation bars 7 to oscillate perpendicularly to their long axes.

The oscillatory structure when operating is excited to oscillate with resonance oscillations by an electronic circuit 11, and a receiver- and evaluation-unit 13 is provided for establishing and/or monitoring on the basis of the oscillation whether the predetermined fill level has been reached, or not. This happens, for example, by the arrangement on a membrane-far side of the piezoelectric element 9 of a transmitting electrode 15 and a receiving electrode 17.

The electronic circuit 11 places on the transmitting electrode 15 an electrical, transmitted signal, which excites the mechanical oscillatory structure to oscillate. The oscillations are received by the receiving electrode 17 and changed into an electrical, received signal. The receiver- and evaluation-unit 13 receives the received signal and compares its frequency with a reference frequency. It produces an output signal which indicates that the mechanical oscillatory structure is covered by a fill material, when the frequency has a value smaller than the reference frequency, and that it is not covered, when the value is larger. In the electrical circuit 11, a control circuit is provided, which regulates a phase difference between the electrical, transmitted signal and the electrical, received signal to a determined, constant value, at which the oscillatory structure executes oscillations with a resonance frequency.

The control circuit is e.g. constructed such that the received signal is amplified and fed back through a phase shifter onto the transmitted signal.

According to the invention, the oscillation bars exhibit a shape in which a mass moment of inertia of a liquid quantity, which the oscillation bars move with them in the immersed state in the liquid, is as large as possible and greater than 0.2 times a mass moment of inertia of the oscillation bars.

"Mass moment of inertia" means always the mass moment of inertia of the oscillation bars 7, or of the liquid mass which moves with the oscillation bars, as the case may be, referenced to the axis in the plane of the membrane 3 and extending perpendicular to the normal to the surfaces of the paddles 8.

Constructing the oscillation bars in this way assures that the device has a high sensitivity $\delta$. A high sensitivity $\delta$ is fundamental for an optimum fitting of the device to a multiplicity of applications. On the basis of the high sensitivity $\delta$, the device can be used without problem even in otherwise very difficult applications, e.g. in liquids with very low density.

An increase of the ratio V, which, as already explained above, is the critical parameter, can occur in many ways. A large ratio V is present, when the oscillation bars 7 exhibit a shape, in which a thickness of the liquid layer moved with the oscillation bars 7 is as large as possible. For this, an area of the oscillation bars 7 projected in the direction of movement is decisive. The greater the area moved through the liquid is in the projection, the greater is also the quantity of liquid that moves therewith.

Since flat elements are better suited for moving large quantities of liquid with them, the oscillation bars 7 are equipped, as shown in FIG. 3, preferably terminally on their membrane-far ends, with flat, mutually parallel paddles 8, which are oriented such that the normal to their surfaces extends perpendicular to the longitudinal axis of the oscillation bars 7.

Figure 4:
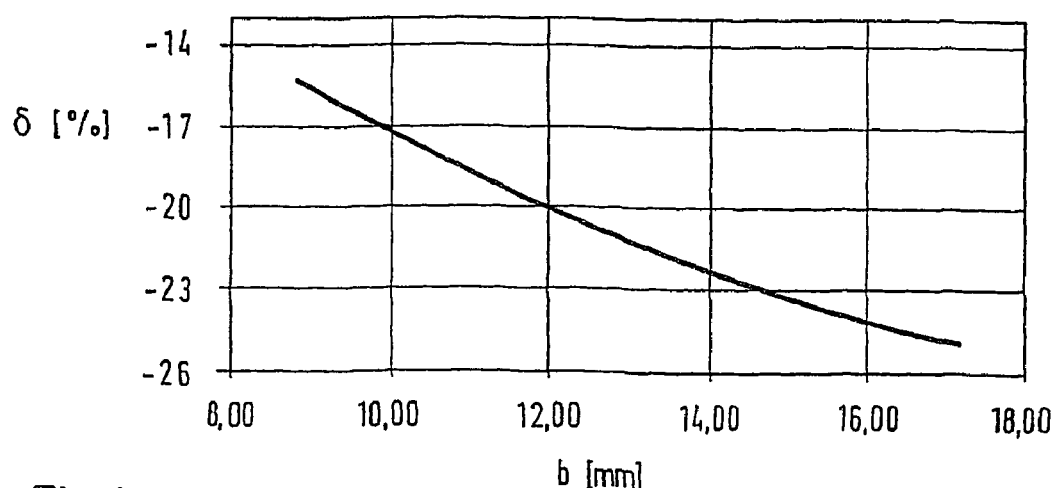
FIG. 4 shows a dependence of the sensitivity of the device on paddle width.
Figure 5:
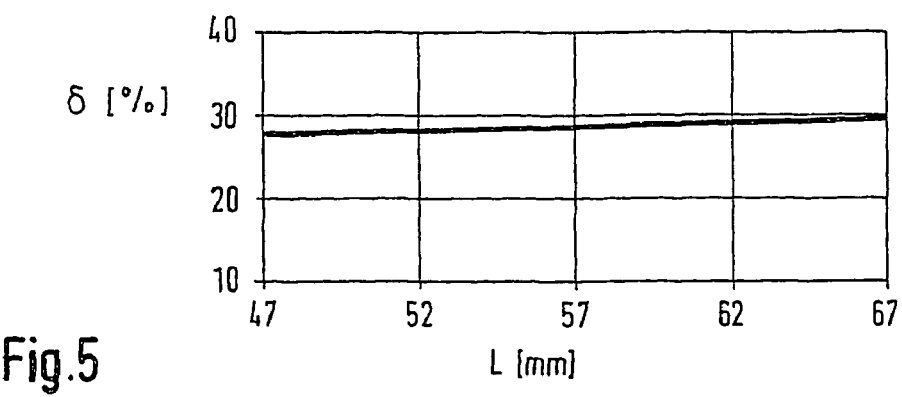
FIG. 5 shows a dependence of the sensitivity of the device on paddle length.

Investigations have shown that the ratio of the mass moment of inertia of the liquid moved with the oscillation bars referenced to the mass moment of inertia of the oscillation bars, so important for the sensitivity of the device, can be noticeably increased, by increasing the width of the oscillation bars 7, or, in the case of the embodiment of the drawing, the width b of the paddle 8. FIG. 4 shows schematically the sensitivity $\delta$ as a function of the width b of the paddles 8. A lengthening of the oscillation bars 7 and/or the paddles 8, in contrast, does not lead to a noticeable increase of the ratio V of the two mass moments of inertia. A lengthening of the oscillation bars 7 increases the mass moment of inertia of the moved liquid and the mass moment of inertia about to the same extent. Consequently, the width b of the paddles 8 is to be maximized, in order to achieve a high sensitivity of the device.

The oscillation bars 7 protrude in operation through the opening 6 into the container. The opening 6 has a diameter of a few centimeters. Membrane 3 has a diameter that is slightly less than the diameter of the opening 6. Correspondingly, the paddles 8 preferably have a maximum width b, at which an outer diameter of the device in the region of the oscillation bars is slightly less than the diameter of the opening 6 in the container.

Although increasing the width b and the length l of the paddles both increase the mass moment of inertia of the oscillation bars 7, only increasing the width b leads to a noticeable increase in the sensitivity $\delta$ of the device.

Figure 6:
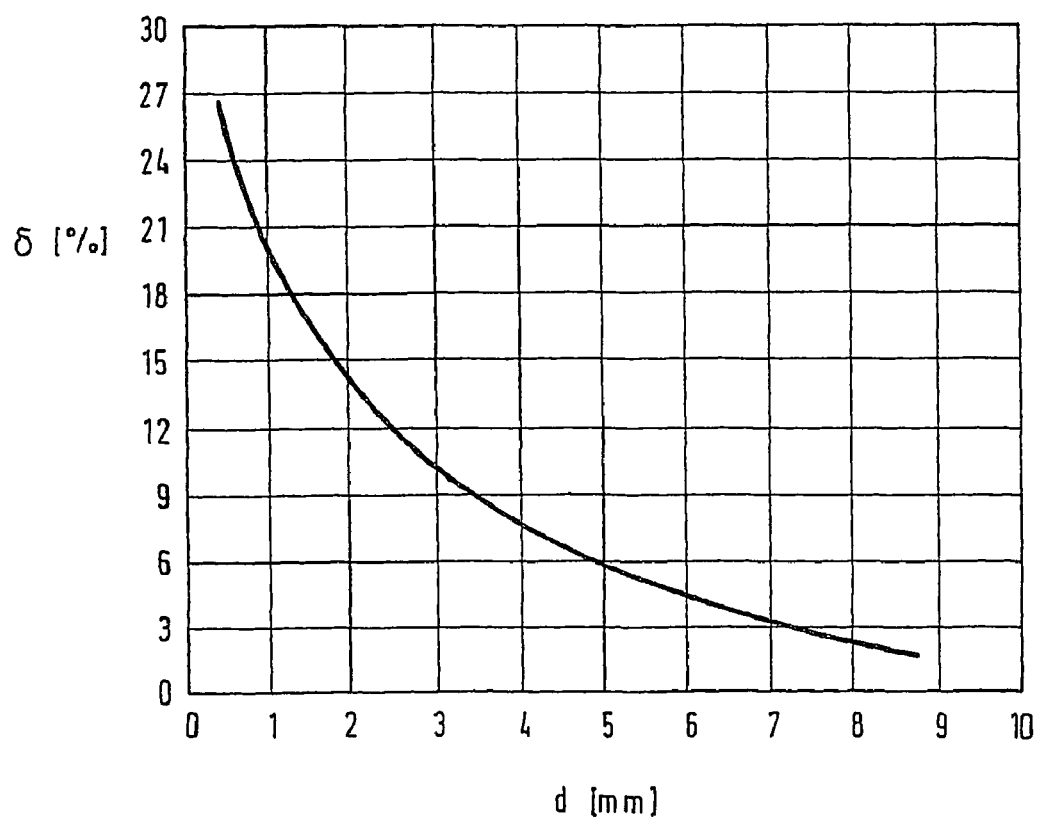
FIG. 6 shows a dependence of the sensitivity of the device on paddle thickness.

To a limited extent, decreasing the thickness d of the paddles can increase the ratio V. Thinner paddles 8 have, for equal projected area moved against the liquid, a smaller mass, and, consequently, a smaller mass moment of inertial than otherwise identical oscillation bars with thicker paddles 8. Since the projected area moved through the liquid remains the same, the amount of liquid moved also remains the same and, consequently, also its mass moment of inertia. Correspondingly, the ratio V of the mass moments of inertia increases. FIG. 6 shown the dependence of the sensitivity of the device on paddle thickness d.

Naturally, decreasing the thickness d of the paddles 8 has limits, which come from the requirement that the oscillation bars 7 and their paddles 8 must not deform, bend or break under the mechanical loads associated with an application. In the case of metallic oscillation bars 7, for reasons of mechanical stability, thicknesses below a limit value of one millimeter thickness should not be used.

The mass moment of inertia of the oscillation bars 7 can, depending on the shape of the oscillation bars, be determined either directly, by means of approximation calculations, or by simulation calculations, e.g. by means of methods of finite element analysis. The mass moment of inertia of the moved liquid mass can be determined indirectly from Equation (1). For this, the sensitivity $\delta$ of the device must be calculated in a first step experimentally or numerically and the mass moment of inertia of the oscillation bars 7 must be available. Simulation programs are available today for the numerical calculation of the sensitivity $\delta$, programs such as e.g. the software package ANSYS of the firm ANSYS, Inc., Canonsburg, Pa. 15317, with which an immersion of the oscillation bars 7 in a liquid can be simulated, and from the simulations the oscillation frequencies can be determined.

Since a length L of the oscillation bars 7 has essentially no influence on the ratio V of the mass moments of inertia, but does indeed affect the mass moment of inertia of the oscillation bars 7, the length L of the oscillation bars 7 can be used to set a desired resonance frequency. Preferably, the length L of the oscillation bars 7, including the paddles 8, is chosen such that the resonance frequency of the oscillatory structure for maximum width b of the paddles is smaller than 1400 Hz. This assures that the device will still work reliably even in effervescing media, e.g. in water containing carbon dioxide.

Preferably, the paddles 8 have a length l, which is 50%+/−10% of the length L of the oscillation bars. A further increasing of the length l of the paddles 8 with respect to the length L of the oscillation bars 7 brings only very little increase in the sensitivity δ, less than 5%, so that it would mean extra cost for material, without a corresponding payback for most applications.

The membrane 3 is made of metal and has a thickness of 0.6 to 1 mm. Such a thickness provides for a metallic membrane 3 an adequate factor of safety, such that the membrane 3 can withstand even strong loads, e.g. from high pressures or mechanical stress.

The following are two optimized examples for oscillation bars 7 with paddles 8.

For a container, in which the opening has a diameter of about 24 mm (½ inch), and the membrane 3 is mounted in the opening in such a way as to close the opening, the oscillation bars 7 preferably have a mass moment of inertia that is less than, or equal to, 18 kgmm² and greater than, or equal to, 1.1 kgmm². The paddles have in such case preferably a thickness between 1 mm and 4.1 mm, and the oscillation bars 7 have a length between 37 mm and 60 mm.

For a container, in which the opening has a diameter of about 12 mm (¼ inch), and the membrane 3 is mounted in the opening in such a way as to close the opening, the oscillation bars 7 preferably have a mass moment of inertia that is less than, or equal to, 1.6 kgmm² and greater than, or equal to, 0.4 kgmm². The paddles have in such case preferably a thickness between 1 mm and 2 mm, and the oscillation bars 7 have a length between 30 mm and 40 mm.

In order to achieve an optimum design for an application, the device is manufactured as follows: First, the maximum diameter of the membrane 3 is determined for a given diameter of the opening 6. Then a mutual separation of the oscillation bars 7 and their thickness is chosen as a function of the diameter of the membrane 3. Next, to obtain a high sensitivity δ for the device, the maximum possible width b of the paddles 8 is determined. This follows from the constraint that it must still be possible to insert the paddles 8 through the opening 1. The length l of the paddle 8 is 0.5 times the total length L of the oscillation bar 7.

Figure 8:
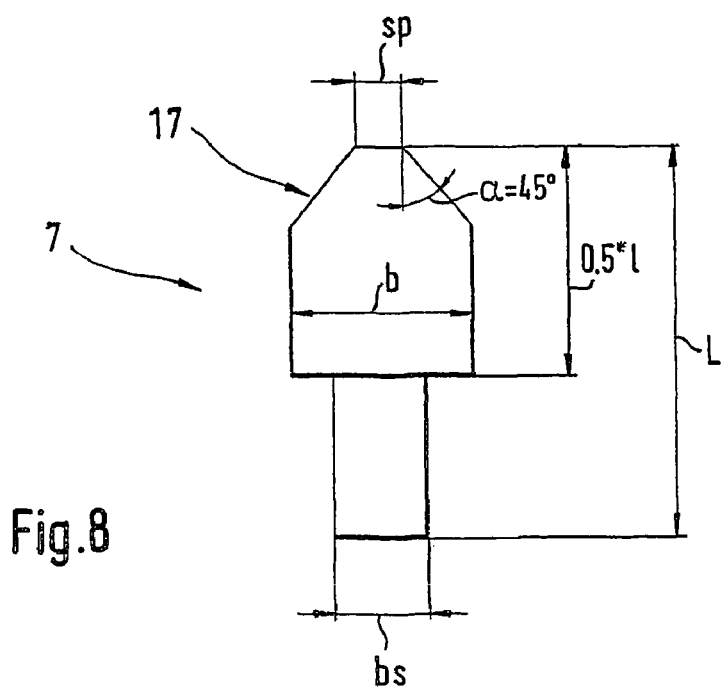
FIG. 8 shows a further example for a shape of the oscillation bars.

FIG. 8 shows an alternative shape B for an oscillation bar 7. This oscillation bar 7 likewise exhibits a bar of rectangular cross section of width bs, with a paddle 8 formed on its membrane-far end. The paddle 8 is rectangular in cross section with a tip 17 pointing away from the membrane. Tip 17 converges with both sides inclined at angles of 45° to the longitudinal axis of the oscillation bar and terminates with a truncated end of width sp. The paddle 8 itself again has the overall dimensions of width b and length l. The length l of the paddle 8 is 0.5 times the total length L of the oscillation bar 7.

The above mentioned program Ansys provides prefabricated liquid elements for simulation of an oscillation of the oscillation bar 7 in a liquid. Consequently, this program can be used to model an oscillation of the oscillation bar 7 in the air and in a liquid. This gives the resonance frequency for both situations, and, with that, as explained above, the sensitivity δ of the device can be determined.

For a bar width bs of 3 mm in the case of Shape A, the following formula is obtained for the sensitivity:

Form A $$\delta(d) := \left[1 - \sqrt{\frac{1}{1 + \frac{(0.0121 \cdot b^2 + 0.026 \cdot b) \cdot \left(\frac{1}{40}\right)^3 \cdot \left(\frac{pfl}{10^{-6}}\right)}{\frac{1}{24} \cdot d \cdot pp \cdot (3 + 7 \cdot b)}}}\right] \cdot 100$$

where ρfl is the density of the liquid and ρp is the density of the oscillation bar 7, the densities are in kg/mm³ and the lengths are in mm.

For the Shape B with a bar width bs of 3 mm and a width sp of 1 mm for the truncated end, the following formula is obtained for the sensitivity:

Form B $$\delta(d) := \left[1 - \sqrt{\frac{1}{1 + \frac{(0.01 \cdot b^2 + 0.043 \cdot b) \cdot \left[\left(\frac{lg}{40}\right)^{3.33} \cdot \left(\frac{pfl}{pH_2 0}\right)\right]}{\frac{1}{24} \cdot d \cdot lg^3 pp \cdot (3 + 7 \cdot b \cdot p) - \frac{1}{192} \cdot (b-1)^4 \cdot d \cdot pp \cdot \left[1 + \frac{\left[lg - \frac{1}{6} \cdot (b-1)^2\right]}{(b-1)^2}\right]}}}\right] \cdot 100$$

into the container. Finally, a minimum length L of the oscillation bars 7 is established, from which a resonance frequency of the oscillatory structure is less than 1400 Hz. The oscillatory structure is then built, taking into consideration the dimensional data determined as described.

Figure 7:
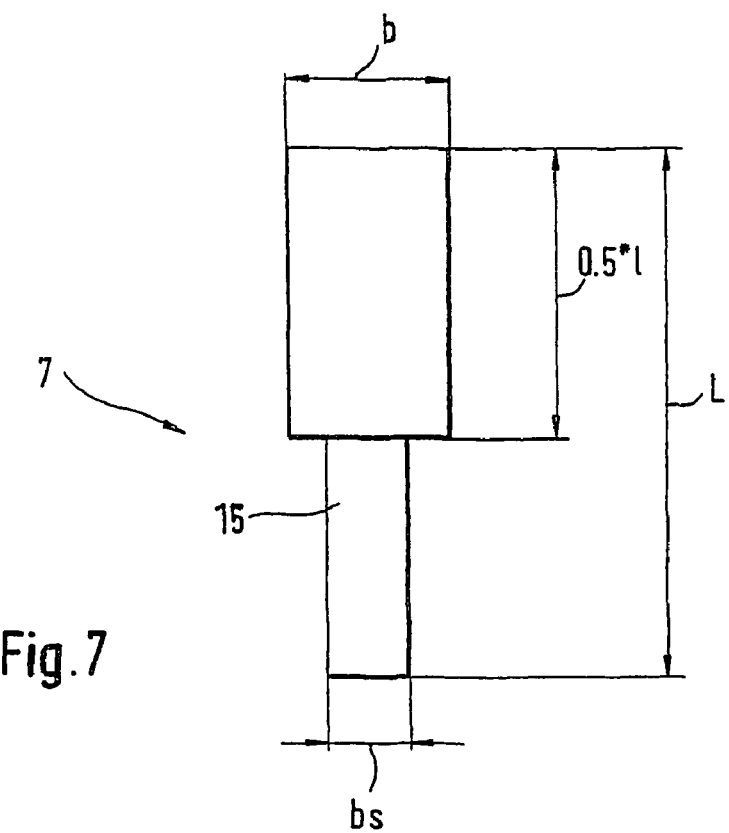
FIG. 7 shows an example for a shape of the oscillation bars.

A shaping of the paddles 8 and its effects on sensitivity can be established numerically. This is explained in the following on the basis of two special shapes. A first shape A is presented in FIG. 7. This is the simplest case of an oscillation bar 7 having a bar of rectangular cross section of width bs and a paddle 8 formed on its membrane-far end. Paddle 8 is likewise rectangular in cross section, with a width b and a length l. Of course, complicated shapes can also be evaluated numerically, and the dependence of sensitivity δ on other parameters can be calculated. This leads to an evaluation of the ratio V for any particular shape. The larger the projected area of the special paddle shape with the least possible mass moment of inertia of the oscillation bar 7, the greater is the sensitivity δ of the device.

The invention claimed is:

1. A device for establishing and/or monitoring a predetermined fill level of a liquid in a container, comprising:
   a mechanical oscillatory structure including a membrane and two mutually separated oscillation bars formed on said membrane and adapted to execute oscillations perpendicular to their longitudinal axis, said mechanical oscillatory structure oscillating with a first resonance frequency, when it is immersed in liquid, and with a second resonance frequency, when it is out of the liquid, and said mechanical oscillatory structure being placed at the height of said predetermined fill level such that at least said oscillation bars are immersed in the liquid, if said predetermined fill level has been reached;

an electromechanical transducer for exciting the oscillatory structure to oscillate and for changing oscillations of said oscillatory structure into an electrical received signal; and a receiver- and evaluation-unit for establishing and/or monitoring, based on a frequency of said electrical received signal, whether the predetermined fill level has been reached, wherein:

said oscillation bars have a shape in which a mass moment of inertia of a liquid quantity, which moves with the oscillating oscillation bars immersed within the liquid is greater than 0.2 times a mass moment of inertia of the oscillation bars.

2. The device as claimed in claim 1, wherein:

a ratio of a difference between said first and second resonance frequencies of said mechanical oscillatory structure related to said second resonance frequency is greater than 16%.

3. The device as claimed in claim 2, wherein:

a ratio of a mass moment of inertia of the liquid quantity to the mass moment of inertia of said oscillation bars is greater than 0.5.

4. The device as claimed in claim 3, wherein:

each of said oscillation bars includes a flat paddle on its membrane end, said paddle being perpendicular to the longitudinal axis of said oscillation bars.

5. The device as claimed in claim 4, wherein:

each of said paddles has a length, which amounts to 50% +/−10% of a length of said oscillation bars.

6. The device as claimed in claim 4, wherein:

an outer diameter of the device in the region of said oscillation bars is less than five centimeters.

7. The device as claimed in claim 4, wherein:

said membrane has a diameter which is less than five centimeters.

8. The device as claimed in claim 4, wherein:

said membrane is made of a metal and has a thickness of 0.6 to 1 mm.

9. The device as claimed in claim 1, wherein:

each of said oscillation bars has a mass moment of inertia in the range from less than, or equal to, 18 kgmm$^2$ to greater than, or equal to, 1.1 kgmm$^2$.

10. The device as claimed in claim 9, wherein:

each of said paddles has a thickness between 1 mm and 4.1 mm.

11. The device as claimed in claim 10, wherein:

each of said oscillation bars has a length between 37 mm and 60 mm.

12. The device as claimed in claim 11, wherein:

said membrane has a diameter of about 24 mm (½ inch).

13. The use of the device as claimed in claim 1, comprising the step of:

employing the device as a level limit switch.

14. The use of the device as claimed in claim 1, comprising the step of:

employing the device as an overfill guard.

15. The use of the device as claimed in claim 1, comprising the step of:

employing the device as protection against pumps running empty.

* * * * *